(12) United States Patent
Harrod et al.

(10) Patent No.: US 7,713,510 B2
(45) Date of Patent: May 11, 2010

(54) PROCESSES FOR OXIDATION OF BROMIDES TO PRODUCE BROMINE AND CATALYSTS USEFUL THEREIN

(75) Inventors: William B. Harrod, Minden, LA (US); Danielle Kristen Garrett, Magnolia, AR (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 11/842,454

(22) Filed: Aug. 21, 2007

(65) Prior Publication Data

US 2008/0085235 A1  Apr. 10, 2008

Related U.S. Application Data

(60) Provisional application No. 60/840,196, filed on Aug. 25, 2006.

(51) Int. Cl.
*C01B 7/09* (2006.01)

(52) U.S. Cl. ............. 423/502; 423/500; 423/504; 423/507

(58) Field of Classification Search ............. 423/500, 423/502, 504, 507
See application file for complete search history.

(56) References Cited

U.S. PATENT DOCUMENTS

| | | | | |
|---|---|---|---|---|
| 4,031,194 | A | * | 6/1977 | Ogawa et al. ............. 423/500 |
| 4,105,753 | A | | 8/1978 | Schulz et al. |
| 4,131,626 | A | * | 12/1978 | Sharma et al. ............. 570/241 |
| 5,139,628 | A | * | 8/1992 | Dear et al. ............. 204/157.79 |
| 5,266,295 | A | | 11/1993 | Barda et al. |
| 5,998,674 | A | | 12/1999 | Taketani et al. |
| 7,297,822 | B2 | * | 11/2007 | Sudhakar et al. ............. 568/639 |
| 2004/0220416 | A1 | * | 11/2004 | Emsenhuber et al. ....... 549/531 |

FOREIGN PATENT DOCUMENTS

| | | |
|---|---|---|
| EP | 0300085 | 1/1989 |
| GB | 930341 | 7/1963 |
| WO | WO93/06039 | 4/1993 |

\* cited by examiner

*Primary Examiner*—Ngoc-Yen M Nguyen
(74) *Attorney, Agent, or Firm*—Marcy M. Hoefling; Jeremy J. Kliebert; James A. Jubinsky

(57) ABSTRACT

Methods are provided for producing bromine wherein an aqueous solution is formed from at least a bromide source, an oxidant, and a catalyst comprising a Group 1 cation and an oxide of a transition metal.

6 Claims, No Drawings

PROCESSES FOR OXIDATION OF BROMIDES TO PRODUCE BROMINE AND CATALYSTS USEFUL THEREIN

REFERENCE TO RELATED APPLICATION

This application claims priority to U.S. Provisional Patent Application No. 60/840,196 filed Aug. 25, 2006, the disclosure of which is herein incorporated by reference in its entirety.

BACKGROUND

Bromine is used in a wide range of industries. For example, bromine is used in the manufacture of flameproofing agents, 1,2-dibromoethane ($CH_2BrCH_2Br$) (which is used as a petrol additive to prevent lead being deposited in cylinders), compounds used in photography (e.g. silver bromide, AgBr, which is the light sensitive material in film), dyestuffs and drugs; in the analytical laboratory in testing for unsaturation in organic compounds, where bromine adds across the multiple bonds of unsaturated compounds, as a disinfectant; and in making fumigants, water purification compounds, dyes, medicinals; and sanitizers. Bromine can be produced by oxidation of bromides using hydrogen peroxide as the oxidant. For example, the following reaction is suitable: $H_2O_2 + 2HBr \longrightarrow Br_2 + 2H_2O$ (Reaction (1)). Bromine can also be produced by oxidation of bromides using chlorine as the oxidant. For example, the following reaction is suitable: $2NaBr + Cl_2 \rightleftharpoons Br_2 + 2NaCl$ (Reaction (2)).

U.S. Pat. No. 5,266,295 describes use of a strong acid, such as sulfuric or phosphoric acid, to improve effectiveness when hydrogen bromide is oxidized to bromine using hydrogen peroxide as the oxidant. However, process economics are affected by the addition of an acid; and in some cases an add source is not readily available. Each of Reactions (1) and (2) could benefit from the addition of catalysts to increase the percent conversion of bromide to bromine. Ammonium molybdate (($NH_4^+)_2MoO_4^-$) is a known oxidation catalyst to allow iodometric titration of $H_2O_2$. However, $NH_4^+$ is not a cation of choice for use as an additive in a commercial bromine tower.

Thus in spite of currently available technologies, a need remains for commercially feasible methods that provide increased percent conversion when oxidizing bromides to produce bromine, and catalysts for use therein.

THE INVENTION

This invention meets the above-described need by providing methods for producing bromine comprising forming an aqueous solution from at least a bromide source, an oxidant, and a catalyst comprising a Group 1 cation and an oxide of a transition metal. Further provided are methods comprising (i) forming an aqueous solution from at least a bromide source, an oxidant, a mineral acid, and a catalyst comprising a Group 1 cation and an oxide of a transition metal, wherein the aqueous solution has a $pK_a$ of less than about $-1.74$; and (ii) producing bromine. Also provided are methods for producing bromine comprising forming an aqueous solution from at least a bromide source, an oxidant, hydrogen chloride, and a catalyst according to this invention. Methods according to this invention can be conducted in continuous mode or batch mode. This invention also provides such methods for producing bromine wherein the aqueous solution has a $pK_a$ that is less than about $-1.74$.

Catalysts

Catalysts used in methods according to this invention comprise a Group 1 cation and an anion comprising a transition metal anion. The Group 1 cation can comprise $Na^+$, $K^+$, $Rb^+$, $Cs^+$, $Fr^+$, $Li^+$, or $H^+$. The anion can comprise an oxide derived from one or more transition metals such as vanadium, cerium, chromium, manganese, niobium, molybdenum, ruthenium, tungsten, rhenium, and/or osmium. For example, the anion can comprise $MoO_4^{-2}$. An example catalyst according to this invention comprises sodium molybdate ($Na_2MoO_4$). Catalysts that comprise transition metal oxide anions that are capable of promoting the decomposition of hydrogen peroxide are useful in methods of this invention as are catalysts wherein the anion is capable of activating hydrogen peroxide toward oxidation of bromide, such that bromine is obtained in at least 90 wt % (or at least 95 wt % or 98 wt %) hydrogen peroxide-based yield.

Bromide Sources

In methods of this invention, the bromide source can comprise hydrogen bromide (HBr) or sodium bromide (NaBr). The HBr can be generated in situ from decomposition of less stable (such as secondary and tertiary) aliphatic alkyl bromides. Other suitable bromide sources comprise potassium bromide (KBr) and lithium bromide (LiBr). Another bromide source suitable for this invention comprises aqueous hydrobromic acid, hydrogen bromide gas, or a Group 1 metal bromide in combination with hydrochloric acid. Group 1 metals include lithium (Li), sodium (Na), and potassium (K).

Oxidants

In methods of this invention, the oxidant can comprise hydrogen peroxide ($H_2O_2$), chlorine ($Cl_2$), or oxygen ($O_2$). The oxidant can comprise a salt of hydrogen peroxide, e.g., lithium peroxide. Chlorine as an oxidant can be introduced as a gas or generated in situ, from chloride ion and peroxides, including hydrogen peroxide. Oxygen, an economically advantageous oxidant of bromide ion, typically requires temperatures higher than ambient temperature for activation, yet it can be used in gaseous form. Oxygen transporters such as cerium oxide or vanadium pentoxide can be used. Other suitable oxidants comprise organic peroxides, e.g. benzoyl peroxide, which decompose upon heating.

Mineral Acids

In methods of this invention, the mineral acid can enhance acidity of the aqueous solution that is formed. Suitable mineral acids include hydrochloric acid, sulfuric acid and/or phosphoric acid.

Oxidation of Bromides to Bromine

Oxidation of bromides to bromine according to this invention typically takes place in a commercial setting in a packed column with addition of the reagents and steam in a continuous system using hydrogen peroxide as an oxidant for bromine production; however, variations are possible as will be familiar to those skilled in the art.

This invention provides that bromine can be derived from about 0.01 wt % to about 60 wt % HBr, about 3 wt % to about 70 wt % $H_2O_2$, about 0.03 wt % to about 0.5 wt % catalyst according to this invention and about 5 wt % to about 20 wt % HCl, all based on the sum of the weights of the HBr, the $H_2O_2$, the catalyst, and the HCl prior to each being used in the bromine derivation. Typically, the bromide source, the oxidant, and the catalyst, and when included, the hydrogen chloride or mineral acid, are in aqueous solution. This invention also provides that the molar ratio of bromide source to catalyst according to this invention can be from about 150:1 to about 1200:1, or about 200:1 to about 1000:1, or about 400:1 to about 900:1, or about 600:1 to about 850:1, or about 658:1 to about 831:1.

EXAMPLES

The following examples are illustrative of the principles of this invention. It is understood that this invention is not limited to any one specific embodiment exemplified herein.

Example 1

HBr (357.20 g of 7.46 wt % aqueous solution; 0.33 mol HBr) and $Na_2MoO_4$ (2.04 g of 4 wt % aqueous solution; 0.4 mmol $Na_2MoO_4$) were added into a 500 mL Erlenmeyer flask along with HCl (16.08 g of 12M HCl; 0.13 mol HCl) and $H_2O_2$ (2.84 g of 70 wt % aqueous solution; 0.06 mol $H_2O_2$). The mixture was stirred, cooled, and kept at 15-20° C. during addition at 10 mL/min into the reflux stream above a 12"×1" column fitted with 24/40 glassware into a 500 mL three-necked round bottomed-flask into which live steam was injected. Excess condensate and HBr were removed by pump and the overhead products, comprising bromine and water, were condensed using a Friedrich's condenser cooled with aqueous glycol at 4-7° C. This condensate and any uncondensables were conveyed into 300 mL (15 wt %) $Na_2SO_3$ solution where the bromine was reduced into bromide ion and quantified by titration with 0.1N $AgNO_3$. A total of 9.27 g bromine was obtained; a $H_2O_2$-based bromine yield of 99.04 wt %.

Example 2

The procedure of Example 1 was used with HBr (356.77 g of 8.96 wt % aqueous solution; 0.40 mol HBr), HCl (11.40 g of 12M HCl; 0.09 mol HCl), $Na_2MoO_4$ (3.09 g of 4 wt % aqueous solution; 0.6 mmol $Na_2MoO_4$), and $H_2O_2$ (2.91 g of 70 wt % aqueous solution; 0.06 mol $H_2O_2$). A total of 8.99 g bromine was obtained; a $H_2O_2$-based bromine yield of 93.91 wt %.

Example 3

Comparative Example

The procedure of Example 1 was used with HBr (356.54 g of 7.52 wt % aqueous solution; 0.33 mol HBr), HCl (17.90 g of 12M HCl; 0.15 mol HCl), and $H_2O_2$ (2.80 g of 70 wt % aqueous solution; 0.06 mol $H_2O_2$). No catalyst according to this invention was added. A total of 7.32 g bromine was obtained; a $H_2O_2$-based bromine yield of 79.38 wt %.

Example 4

Comparative Example

The procedure of Example 1 was used with HBr (360.80 g of 6.19 wt % aqueous solution; 0.28 mol HBr), HCl (19.27 g of 12M HCl; 0.16 mol HCl), and $H_2O_2$ (3.39 g of 70% wt aqueous solution; 0.07 mol $H_2O_2$) added into the feed HBr. No catalyst according to this invention was added. A total of 5.19 g bromine was obtained; a $H_2O_2$-based bromine yield of 46.43 wt.

Example 5

Comparative Example

The procedure of Example 1 was used with HBr (355.68 g of 7.46 wt % aqueous solution; 0.33 mol HBr), HCl (159.02 g of 30 wt % aqueous solution; 1.14 mol HCl), and $H_2O_2$ (2.65 g of 70 wt % aqueous solution; 0.06 mol $H_2O_2$). No catalyst according to this invention was added. A total of 8.30 g bromine was obtained; a $H_2O_2$-based bromine yield of 95.09 wt %.

Example 6

Comparative Example

The procedure of Example 1 was used with HBr (356.65 g of 17.20 wt % aqueous solution; 0.76 mol HBr), HCl (22.04 wt % by titration; 46.10 g (0.28 mol) HCl), and $H_2O_2$ (14.98 g of 70 wt % aqueous solution; 0.31 mol $H_2O_2$); in addition, a recycle acid source was used. No catalyst according to this invention was added. A total of 45.65 g bromine was obtained; a $H_2O_2$-based bromine yield of 92.50 wt %.

As can be see from these examples (data summarized in Table 1), use of a catalyst of this invention in a bromine oxidation reaction improves $Br_2$ yield. Compare the oxidation reaction of Example 3, where 0.33 mol HBr were oxidized using 0.15 mol HCl and 0.06 mol $H_2O_2$, resulting in a $H_2O_2$-based $Br_2$ yield of 79.38 wt %, to the reaction of Example 1, where 0.33 mol HBr were oxidized using 0.13 mol HCl, 0.06 mol $H_2O_2$, and 0.4 mmol of a catalyst according to this invention ($Na_2MoO_4$), resulting in a $H_2O_2$-based $Br_2$ yield of 99.04 wt % (vs. the 79.38 wt % yield of Example 3). Also compare Example 3 to Example 2, where slightly less HCl was used (0.09 mol vs. 0.15 mol), and 0.6 mmol of a catalyst according to this invention ($Na_2MoO_4$) was used, resulting in a $H_2O_2$-based $Br_2$ yield of 93.91 wt % (vs. the 79.38 wt % yield of Example 3). The Examples also show that increased amounts of HCl cam improve the effectiveness in a bromine oxidation reaction. For example, comparing Example 3 to Example 5, increasing HCl from 0.15 mol to 1.14 mols can result in increased oxidant-based bromine ($Br_2$) yield from 79.38 wt % to 95.09 wt %.

TABLE 1

| Example Number | HBr (mols) | HCl (mols) | $H_2O_2$ (mols) | $Na_2MoO_4$ (mmols) | $H_2O_2$-based $Br_2$ yield (wt %) |
|---|---|---|---|---|---|
| 1 | 0.33 | 0.13 | 0.06 | 0.4 | 99.04 |
| 2 | 0.40 | 0.09 | 0.06 | 0.6 | 93.91 |
| 3 | 0.33 | 0.15 | 0.06 | — | 79.38 |
| 4 | 0.28 | 0.16 | 0.07 | — | 46.43 |
| 5 | 0.33 | 1.14 | 0.06 | — | 95.09 |
| 6 | 0.76 | 0.28 | 0.31 | — | 92.50 |

While the present invention has been described in terms of one or more preferred embodiments, it is to be understood that other modifications may be made without departing from the scope of the invention, which is set forth in the claims below.

We claim:
1. A method comprising:
(i) passing an aqueous solution and steam through a packed column in a continuous process wherein the aqueous solution (a) has been formed from at least a bromide source, hydrogen peroxide ($H_2O_2$), a mineral acid, and a catalyst comprising a Group 1 cation and an oxide of a transition metal, (b) has a $pK_a$ of less than about −1.74, and (c) is at 15 to 20° C.;
and
(iii) producing bromine in at least a 90 wt % hydrogen peroxide-based yield.

2. A method according to claim 1 wherein the Group 1 cation comprises $Na^+$ or $K^+$.

3. A method according to claim 1 wherein the oxide comprises molybdate ($MoO_4^{-2}$).

4. A method according to claim 1 wherein the catalyst comprises sodium molybdate ($Na_2MoO_4$).

5. A method according to claim 1 wherein the bromide source comprises hydrogen bromide or sodium bromide.

6. A method according to claim 4 wherein the molar ratio of bromide source to catalyst is from about 150:1 to about 1200:1.

* * * * *